United States Patent
Yang et al.

(10) Patent No.: US 12,541,895 B2
(45) Date of Patent: Feb. 3, 2026

(54) METHOD AND APPARATUS FOR PROCESSING PORTRAIT IMAGE

(71) Applicant: Lemon Inc., Grand Cayman (KY)

(72) Inventors: Xiao Yang, Los Angeles, CA (US);
Jianwei Li, Los Angeles, CA (US);
Ding Liu, Los Angeles, CA (US);
Yangyue Wan, Los Angeles, CA (US);
Xiaohui Shen, Los Angeles, CA (US);
Jianchao Yang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 261 days.

(21) Appl. No.: 18/257,158

(22) PCT Filed: Nov. 22, 2021

(86) PCT No.: PCT/SG2021/050717
§ 371 (c)(1),
(2) Date: Jun. 13, 2023

(87) PCT Pub. No.: WO2022/132032
PCT Pub. Date: Jun. 23, 2022

(65) Prior Publication Data
US 2024/0104810 A1 Mar. 28, 2024

(30) Foreign Application Priority Data
Dec. 17, 2020 (CN) .......................... 202011503302.2

(51) Int. Cl.
*G09G 5/00* (2006.01)
*G06T 5/70* (2024.01)
(Continued)

(52) U.S. Cl.
CPC ................ *G06T 11/60* (2013.01); *G06T 5/70* (2024.01); *G06T 5/77* (2024.01); *G06T 7/12* (2017.01);
(Continued)

(58) Field of Classification Search
CPC ......... G06T 11/60; G06T 19/00; G06T 11/00; G06T 11/20; G06T 11/206; G06T 7/0012;
(Continued)

(56) References Cited

U.S. PATENT DOCUMENTS

| 8,249,365 | B1 * | 8/2012 | Winnemoeller | ...... G06F 3/0484 382/181 |
| 2008/0267443 | A1 * | 10/2008 | Aarabi | ................. G06V 40/162 382/100 |

(Continued)

FOREIGN PATENT DOCUMENTS

| CN | 102800129 A | 11/2012 |
| CN | 105427280 A | 3/2016 |

(Continued)

OTHER PUBLICATIONS

China National Intellectual Property Administration, Office Action and Search Report Issued in Application No. 202011503302.2, Jan. 4, 2024, 7 pages. (Submitted with Translation of Office Action).

(Continued)

*Primary Examiner* — Gordon G Liu
(74) *Attorney, Agent, or Firm* — Alleman Hall LLP

(57) ABSTRACT

Embodiments of the disclosure provide a method and a device for processing a portrait image, the method includes: acquiring a to-be-processed portrait image; inputting the to-be-processed portrait image into an image processing model, and acquiring a head smear image output by the image processing model, where the image processing model is configured to smear a hair area of a portrait located above a preset boundary in the portrait image, and the image processing model is generated by training a sample data set of a sample portrait image and a sample head smear image corresponding to the sample portrait image; rendering the head smear image with a head effect material to obtain a (Continued)

portrait image added with an effect; and displaying the portrait image added with the effect.

16 Claims, 10 Drawing Sheets

(51) Int. Cl.
*G06T 5/77* (2024.01)
*G06T 7/12* (2017.01)
*G06T 11/60* (2006.01)
*G06V 10/25* (2022.01)
*G06V 10/56* (2022.01)

(52) U.S. Cl.
CPC .............. *G06V 10/25* (2022.01); *G06V 10/56* (2022.01); *G06T 2207/10024* (2013.01)

(58) Field of Classification Search
CPC . G06T 2207/10081; G06T 2207/30004; G06T 11/203; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06V 20/20; G06V 10/7753; G11B 27/10; H04N 21/47217; G16H 30/20; G06N 20/20; G06N 3/045; G06Q 30/0643
USPC .......................................................... 345/419
See application file for complete search history.

(56) References Cited

U.S. PATENT DOCUMENTS

| | | | |
|---|---|---|---|
| 2014/0198108 A1* | 7/2014 | Sigal | ..................... G06T 13/40 |
| | | | 345/474 |
| 2017/0270679 A1 | 9/2017 | Koven | |
| 2018/0075524 A1 | 3/2018 | Sartori Odizzio et al. | |
| 2022/0101577 A1* | 3/2022 | Chakrabarty | ............. G06T 7/11 |

FOREIGN PATENT DOCUMENTS

| | | |
|---|---|---|
| CN | 107392099 A | 11/2017 |
| CN | 107451950 A | 12/2017 |
| CN | 108053366 A | 5/2018 |
| CN | 108492348 A | 9/2018 |
| CN | 109409335 A | 3/2019 |
| CN | 109447895 A | 3/2019 |
| CN | 109886144 A | 6/2019 |
| CN | 110136054 A | 8/2019 |
| CN | 110189340 A | 8/2019 |
| CN | 110321865 A | 10/2019 |
| CN | 111368685 A | 7/2020 |
| CN | 111783662 A | 10/2020 |
| CN | 111862116 A | 10/2020 |
| EP | 3723050 A1 | 10/2020 |
| EP | 3736729 A1 | 11/2020 |
| WO | 2013189101 A1 | 12/2013 |
| WO | 2020108041 A1 | 6/2020 |

OTHER PUBLICATIONS

Intellectual Property Office of Singapore, International Search Report Issued in Application No. PCT/SG2021/050717, Feb. 17, 2022, WIPO, 17 pages.
China National Intellectual Property Administration, Office action issued in Chinese Application No. 202011503302.2, Apr. 25, 2023, 12 pages (submitted with English summary).

* cited by examiner

METHOD AND APPARATUS FOR PROCESSING PORTRAIT IMAGE

CROSS-REFERENCE TO RELATED DISCLOSURES

This application is a National Stage of International application No. PCT/SG2021/050717, filed on Nov. 22, 2021, which claims a priority of Chinese Patent Application No. 202011503302.2 filed with China National Intellectual Property Administration on Dec. 17, 2020, both of which are hereby incorporated by reference in their entireties.

TECHNICAL FIELD

Embodiments of the present disclosure relate to the technical field of image processing and, in particular, to a method and an apparatus for processing a portrait image.

BACKGROUND

With the development of multimedia technologies, requirements for image processing technology are getting higher and higher. In order to make a photographed portrait image more artistic, during the process of taking a photo or a video, a user can process the portrait image by adding a head effect such as a hairstyle and/or a hair accessory, so as to change an original hairstyle and/or hair accessory of a portrait in the portrait image.

In related art, when a head effect is adopted to change a hairstyle of a portrait in a portrait image, the head effect specified by a user is often added to the portrait image directly.

However, due to differences among portraits in portrait images, original hairs of a portrait may not be completely covered by a head effect, which may cause mismatching between the original hairs of the portrait and the head effect, so that a combination of the added head effect and the portrait image is not natural enough, and thus, the imaging effect of the portrait image added with the effect is poor.

SUMMARY

The embodiments of the present disclosure provide a method and an apparatus for processing a portrait image, so as to solve the problem of a poor imaging effect of the portrait image added with the effect due to the fact that a combination of a head effect and a portrait image is not natural enough.

In a first aspect, an embodiment of the present disclosure provides a method for processing a portrait image, including:
    acquiring a to-be-processed portrait image;
    inputting the to-be-processed portrait image into an image processing model, and acquiring a head smear image output by the image processing model, where the image processing model is configured to smear a hair area of a portrait located above a preset boundary in the portrait image, and the image processing model is generated by training a sample data set of a sample portrait image and a sample head smear image corresponding to the sample portrait image;
    rendering the head smear image with a head effect material to obtain a portrait image added with an effect;
    displaying the portrait image added with the effect.

In a second aspect, an embodiment of the present disclosure provides a method for training an image processing model, including:
    acquiring a sample data set, where the sample data set includes a sample portrait image and a sample head smear image corresponding to the sample portrait image, where the sample head smear image is generated by smearing a hair area of a portrait located above a preset boundary in the sample portrait image;
    training the image processing model with the sample data set to generate a trained image processing model.

In a third aspect, an embodiment of the present disclosure provides an apparatus for processing a portrait image, including:
    an acquiring module, configured to acquire a to-be-processed portrait image;
    a processing module, configured to input the to-be-processed portrait image into an image processing model, and acquire a head smear image output by the image processing model, where the image processing model is configured to smear a hair area of a portrait located above a preset boundary in the portrait image, and the image processing model is generated by training a sample data set of a sample portrait image and a sample head smear image corresponding to the sample portrait image;
    a rendering module, configured to render the head smear image with a head effect material to obtain a portrait image added with an effect;
    a displaying module, configured to display the portrait image added with the effect.

In a fourth aspect, an embodiment of the present disclosure provides an apparatus for training an image processing model, including:
    a sample acquiring module, configured to acquire a sample data set, where the sample data set includes a sample portrait image and a sample head smear image corresponding to the sample portrait image, where the sample head smear image is generated by smearing a hair area of a portrait located above a preset boundary in the sample portrait image;
    a training module, configured to train the image processing model with the sample data set to generate a trained image processing model.

In a fifth aspect, an embodiment of the present disclosure provides an electronic device, including: at least one processor and a memory;
    the memory stores computer-executed instructions;
    the at least one processor executes the computer-executed instructions stored in the memory, so as to enable the at least one processor to execute the method for processing the portrait image as described above in the first aspect and various possible designs of the first aspect, or execute the method for training the image processing model as described above in the second aspect and various possible designs of the second aspect.

In a sixth aspect, an embodiment of the present disclosure provides a computer-readable storage medium storing computer-executable instructions, when the computer-executable instructions are executed by a processor, the method for processing the portrait image as described above in the first aspect and various possible designs of the first aspect is implemented, or the method for training the image processing model as described above in the second aspect and various possible designs of the second aspect is implemented.

In a seventh aspect, an embodiment of the present disclosure provides a computer program product including computer instructions, when the computer instructions are executed by a processor, the method for processing the portrait image as described above in the first aspect and various possible designs of the first aspect is implemented, or the method for training the image processing model as described above in the second aspect and various possible designs of the second aspect is implemented.

In an eighth aspect, an embodiment of the present disclosure provides a computer program, when the computer program is executed by a processor, the method for processing the portrait image as described above in the first aspect and various possible designs of the first aspect is implemented, or the method for training the image processing model as described above in the second aspect and various possible designs of the second aspect is implemented.

According to the method and the apparatus for processing the portrait image provided by the embodiments, in the method, firstly, a to-be-processed portrait image is acquired; secondly, the to-be-processed portrait image is input into an image processing model, and a head smear image output by the image processing model is acquired, where the image processing model is configured to smear a hair area of a portrait located above a preset boundary in the portrait image, and the image processing model is generated by training a sample data set of a sample portrait image and a sample head smear image corresponding to the sample portrait image; thirdly, the head smear image is rendered with a head effect material to obtain a portrait image added with an effect; and thereafter, the portrait image added with the effect is displayed. Compared with the prior art, in the present disclosure, a hair area of the portrait in the portrait image is smeared first to obtain the head smear image, and then a head effect material is added to the head smear image, mismatch or unnatural connection between original hairs of the portrait in the portrait image and the head effect material is avoided, the combination of the head effect material and the portrait image becomes more natural, and the imaging effect of the portrait image added with the effect is improved.

BRIEF DESCRIPTION OF DRAWINGS

In order to explain the embodiments of the present disclosure or the technical solutions in the prior art more clearly, the drawings that need to be used in the description of the embodiments or the prior art will be briefly introduced below. Obviously, the drawings in the following description are some embodiments of the present disclosure, and for those of ordinary skilled in the art, other drawings can be obtained according to these drawings without paying creative efforts.

DESCRIPTION OF EMBODIMENTS

In order to make the objections, technical solutions and advantages of the embodiments of the present disclosure clearer, the technical solutions in the embodiments of the present disclosure will be described clearly and comprehensively with reference to the drawings in the embodiments of the present disclosure. Obviously, the described embodiments are part of the embodiments of the present disclosure, rather than all of them. Based on the embodiments in the present disclosure, all other embodiments obtained by those of ordinary skilled in the art without paying creative efforts belong to the protection scope of the present disclosure.

In order to solve the above-mentioned problem of a poor imaging effect of the portrait image added with the effect due to the fact that a combination of a head effect and a portrait image is not natural enough, the embodiments of the present application provide a method and an apparatus for processing a portrait image, where a hair area of a to-be-processed portrait is smeared to generate a head smear image, and then the head smear image is rendered to obtain the portrait image added with an effect, mismatch or unnatural connection between original hairs of the portrait in the portrait image and the head effect material is avoided, the combination of the head effect material and the portrait image becomes more natural, and the imaging effect of the portrait image added with the effect is improved.

The embodiments of the present disclosure relate to various scenarios requiring portrait image processing. Illustratively, for a photographed image, a user can modify a portrait image by adding a head effect material to replace an original hairstyle or hair accessory of the portrait in the portrait image. Illustratively, for a video uploaded by a user, a user can also process one or more frames of portrait images in the video by adding a head effect material to replace a hairstyle or hair accessory of the portrait in the portrait image. Illustratively, in the process of shooting a video, a user can also add a head effect material to one or more frames of the video in real time.

The technical solutions of the embodiments of the present application will be explained in detail in the following specific embodiments. The following specific embodiments can be combined with each other, and the same or similar concepts or processes may not be repeated in some embodiments.

Figure 1:
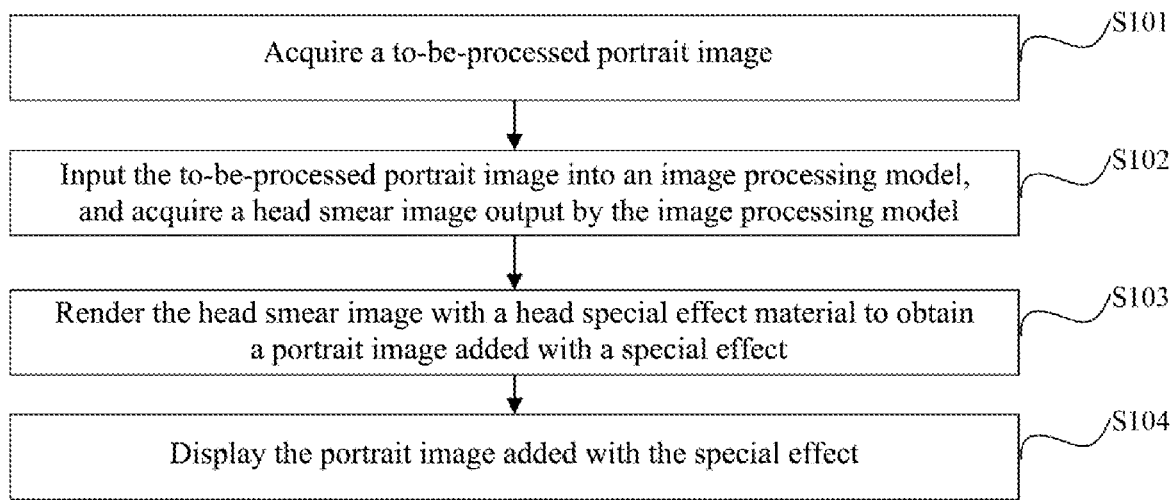
FIG. 1 is a schematic flowchart of a method for processing a portrait image provided by an embodiment of the present disclosure.

Referring to FIG. 1, FIG. 1 is a schematic flowchart of a method for processing a portrait image provided by an embodiment of the present disclosure. The method of the embodiment can be applied to a terminal device, and the method for processing the portrait image includes the following steps.

S101: acquiring a to-be-processed portrait image.

In the embodiment, the acquiring of the to-be-processed portrait image can be triggered by an image 6onnectin instruction input by a user.

Illustratively, the user can input the image 6onnectin instruction to the terminal device by touching a trigger control on a screen, the user can also input the image 6onnectin instruction to the terminal device in the form of voice, and the user can also input the image 6onnectin instruction to the terminal device in the form of expression, which is not limited in the present disclosure.

It should be understood that the present disclosure does not limit how to acquire the to-be-processed portrait image. In an embodiment of the present disclosure, the terminal device can acquire the to-be-processed portrait image from an internal memory, and in another embodiment of the present disclosure, the terminal device can call a camera component to shoot the to-be-processed portrait image in real time.

It should be noted that the to-be-processed portrait image acquired in the embodiments of the present application can be a collected image or a frame of image in a collected video, which is not limited in the embodiment.

S102: inputting the to-be-processed portrait image into an image processing model, and acquiring a head smear image output by the image processing model.

In an embodiment, the image processing model is configured to smear a hair area of a portrait located above a preset boundary in the portrait image.

It should be understood that in the embodiments of the present application, there is no limitation on how to smear the hair area. In some embodiments, the terminal device can smear the hair area with a background color of the portrait image, and in other embodiments, depending on needs in terms of the display effect, the terminal device can also smear the hair area with a fixed color (such as white).

Illustratively, the image processing model can smear a head of the portrait image based on the preset boundary. For a portrait image whose hair end is below the preset boundary, the image processing model smears out the hair area above the preset boundary, reserves the hair area below the preset boundary, and outputs the head smear image where some hairs have been smeared out. For a portrait image whose hair end is above the preset boundary, after the image processing model smears the hair area above the preset boundary, since there is no hair below the preset boundary of the portrait, the head smear image output by the image processing model is a head smear image where all the hairs have been smeared out.

Figure 2A:
FIG. 2a is a schematic diagram of a display interface provided by an embodiment of the present disclosure.
Figure 2B:
FIG. 2b is a schematic diagram of another display interface provided by an embodiment of the present disclosure.

Illustratively, FIG. 2a is a schematic diagram of a display interface provided by an embodiment of the present disclosure, and FIG. 2b is a schematic diagram of another display interface provided by an embodiment of the present disclosure. The acquired portrait image is displayed in the display interface of FIG. 2a. The terminal device smears the hair area above the preset boundary in the portrait by using the image processing model, and reserves the hair area below the preset boundary in the portrait, thereby generating a head smear image as shown in FIG. 2b. The preset boundary in FIG. 2b is a shoulder-neck boundary.

It should be noted that the preset boundary in the embodiment can be a boundary at any position on the portrait, which can be a straight line or a curve, which is not limited in the embodiments of the present application.

Illustratively, continuing referring to FIGS. 2a and 2b, the preset boundary may include a shoulder-neck boundary of the portrait, which may be formed by connecting shoulder-neck key points of the portrait. Accordingly, when processing the to-be-processed portrait image, the image processing model can be smear out hairs above the shoulder-neck boundary and reserve long hairs below the shoulder-neck boundary, as shown in FIG. 2b.

Illustratively, the preset boundary can also be an ear boundary of the portrait, and the ear boundary of the portrait can be formed by a line connecting top ends of two ears. Accordingly, when processing the to-be-processed portrait image, the image processing model can smear out hairs above the ear boundary and reserve hairs below the ear boundary.

Illustratively, the preset boundary can also be an eyebrow boundary of the portrait, which can be formed by connecting eyebrow key points of the portrait. Accordingly, when processing the to-be-processed portrait image, the image processing model can smear out hairs above the eyebrow boundary and reserve hairs below the eyebrow boundary.

It should be understood that the image processing model related to the embodiment is generated by training a sample data set. The sample data set contains multiple groups of sample portrait images and sample head smear images corresponding to the sample portrait images.

The sample portrait image can be a portrait image with short hair or a portrait image with long hair, which is not limited in the embodiment. Besides, in addition to the hair area, the sample portrait image may further include any other area, for example, may further include some or all of a face area, an ear area, a shoulder-neck area, an upper body area, and the like.

It should be understood that the sample head smear image is generated by smearing a hair area of the portrait located above the preset boundary in the sample portrait image.

It should be noted that reference can be made to subsequent embodiments for the content of training the image processing model involved in the embodiment.

In some alternative embodiments, the image processing model can smear, with the background color of the portrait image, a hair area located above the preset boundary and outside a preset area, and perform gradation smear processing on hairs located in the preset area.

It should be noted that the smear processing and the gradation smear processing involved in the embodiment are not the same. Smear processing on the hair area located above the preset boundary and outside the preset area is to smear out colors of all hairs in this area completely; gradation smear processing for the hairs in the preset area is to make a color of the hairs in the preset area gradually change, from bottom to top, from the hair color to the background color of the portrait image.

It should be understood that the preset area is adjacent to the preset boundary and located above the preset boundary. In the embodiment, there is no limitation on a size of the preset area, which can be preset by a user or determined according to a size of the to-be-processed portrait image.

Illustratively, continuing referring to FIG. 2b, when the preset boundary is a shoulder-neck boundary, the shadow area as shown in FIG. 2b above the shoulder-neck boundary (the shadow area is indicated as a gradation area in the drawing) can be used as a preset area for gradation smear processing, and the hair area located above the shoulder-neck boundary and outside the preset area can be smeared, so that original hairs reserved in the shoulder-neck area can be combined with a head effect material more naturally after subsequent addition of the head effect material.

In the embodiment, gradation smear processing is performed on the preset area above the preset boundary, so that the color of hairs of the original portrait in the preset area can change to the background color more naturally, therefore, the head smear image can be better combined with the subsequently added head effect material.

Figure 2C:
FIG. 2c is a schematic diagram of yet another display interface provided by an embodiment of the present disclosure.

In some alternative embodiments, the image processing model is further configured to perform forehead lifting processing on the portrait. By performing forehead lifting processing on the portrait, the head smear image can be better attached when being rendered with the head effect material subsequently, and the problem of fracture between the forehead and the head effect material can be avoided. Illustratively, FIG. 2c is a schematic diagram of yet another display interface provided by an embodiment of the present disclosure. Referring to FIG. 2c, the forehead area is extended to some extent upward on the basis of the original forehead, so that the forehead area can be better combined with the head effect material, and the problem of fracture or other unnatural connection between the forehead and the head effect material can be avoided.

S103: rendering the head smear image with a head effect material to obtain a portrait image added with an effect.

The head effect material can include a hairstyle, a hair accessory and other head effect elements. In an embodiment of the present disclosure, before rendering the head smear image, the terminal device may receive an effect selecting instruction from a user and determine the head effect material selected by the user according to the effect selecting instruction.

It should be understood that, in some embodiments, the effect selecting instruction can be indicative of triggering to render the head effect material on the head smear image. Accordingly, after receiving the effect selecting instruction, the terminal device can use the recommended head effect or the head effect pre-selected by the user to render the head smear image.

In other embodiments, the effect selecting instruction can be indicative of the head effect material selected by the user, and accordingly, the terminal device, after receiving the effect selecting instruction, can directly use the head effect material indicated by the effect selecting instruction to render the head smear image.

Illustratively, if a first head effect material is indicated in the effect selecting instruction, the terminal device can use the first head effect material to render the head smear image after receiving the effect selecting instruction. If a second head effect material is indicated in the effect selecting instruction, the terminal device can use the second head effect material to render the head smear image after receiving the effect selecting instruction. The first head effect material and the second head effect material are different head effect materials.

In some embodiments, the head effect material may have multiple head effect elements. For example, the head effect material can contain a variety of hairstyle elements and a variety of headwears. Accordingly, the terminal device can determine a target head effect element from the multiple head effect elements, and use the target head effect element to render the frame of image.

Illustratively, for a collected portrait image, the terminal device can also select at least one head effect element from the head effect material, and use the selected head effect element to render the head smear image to obtain a portrait image added with the effect.

Illustratively, for a collected video, the terminal device can select at least one head effect element from the head effect material for a frame of image, and use the selected head effect element to render the frame of image to obtain a portrait image added with the effect; for another frame of image in the video, the terminal device can re-select at least one head effect element from the head effect material, and use the selected head effect element to render the frame of image to obtain a portrait image added with the effect, thereby obtaining the video added with the effect(s).

It should be understood that the user's head effects in the video can also be changed, i.e., the terminal device can select different head effect elements for different frames of images in the same video. In some embodiments, based on an effect switching instruction collected from a user, the terminal device can re-select a target head effect element from the multiple head effect elements. In some embodiments, based on a preset effect switching period, the terminal device can select a target head effect element from multiple head effect elements, thereby realizing the transformation of the head effect of the user in the video.

The effect switching instruction from the user can be triggered by an expression, a gesture, or a trigger control on a screen, and the present disclosure does not limit a mode for triggering the effect switching instruction. Illustratively, taking gesture triggering as an example, in a collected video, after detecting, at the first moment, that the user's gesture has changed, the terminal device can select a target head effect element from multiple head effect elements, and use the selected target head effect element to re-render the head smear image corresponding to each frame of image after the first moment.

It should be understood that in the embodiment, there is no limitation on how the terminal device selects a target head effect element from multiple head effect elements. In some embodiments, the terminal device can randomly select the target head effect element, and in other embodiments, the terminal device can sequentially select the target head effect element from multiple head effect elements in a circular manner (round robin manner).

It should be understood that the target head effect element selected by the terminal device can be one or more at each time, which is not limited in the embodiment. Illustratively, the terminal device can simultaneously select at least one hairstyle and at least one hair accessory for the same frame of image.

It should be noted that if the head effect material simply contains one head effect element, the head effect material, the head effect element and the target head effect element involved in the embodiment are equivalent.

S104: displaying the portrait image added with the effect.

Figure 2D:
FIG. 2d is a schematic diagram of still another display interface provided by an embodiment of the present disclosure.

Illustratively, FIG. 2d is a schematic diagram of still another display interface provided by an embodiment of the present disclosure. Referring to FIG. 2d, after generating a portrait image added with an effect, the terminal device displays the portrait image added with the effect on the display interface.

According to the method for processing the portrait image provided in the embodiment, in the method, firstly a to-be-processed portrait image is acquired; secondly, the to-be-processed portrait image is input into an image processing model, and a head smear image output by the image processing model is acquired, where the image processing model is configured to smear a hair area of a portrait located above a preset boundary in the portrait image, and the image processing model is generated by training a sample data set of a sample portrait image and a sample head smear image corresponding to the sample portrait image; thirdly, the head smear image is rendered with a head effect material to obtain a portrait image added with an effect; and thereafter the portrait image added with the effect is displayed. Compared with the prior art, in the present disclosure, a hair area of the portrait in the portrait image is smeared first to obtain the head smear image, and then a head effect material is added to the head smear image, mismatch or unnatural connection between original hairs of the portrait in the portrait image and the head effect material is avoided, the combination of the head effect material and the portrait image becomes more natural, and the imaging effect of the portrait image added with the effect is improved.

Figure 3:
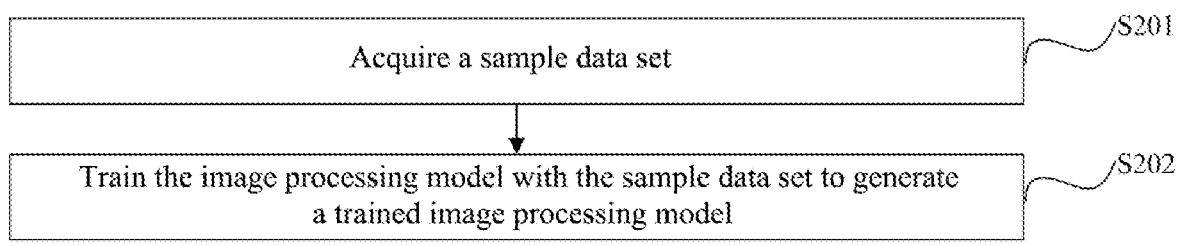
FIG. 3 is a schematic flowchart of a method for training an image processing model provided by an embodiment of the present disclosure.

In the following, how to train an image processing model will be described. Referring to FIG. 3, FIG. 3 is a schematic flowchart of a method for training an image processing model provided by an embodiment of the present disclosure. The method for training the image processing model can be realized by an apparatus for training the image processing model, where the apparatus for training the image processing model can be a terminal device or a server. The method for training the image processing model includes the following.

S201: acquiring a sample data set.

In the embodiment, the sample data set includes a sample portrait image and a sample head smear image corresponding to the sample portrait image.

The sample portrait image can be a portrait image with short hair or a portrait image with long hair, which is not limited in the embodiment. Besides, in addition to the hair area, the sample portrait image may further include any other area, for example, may further include some or all of a face area, an ear area, a shoulder-neck area, an upper body area, and the like.

It should be noted that, in the embodiment, there is no limitation on how to generate the sample head smear image, and in some embodiments, the sample head smear image can be generated by smearing a hair area of a portrait which is located above the preset boundary in the sample portrait image.

Figure 4A:
FIGS. 4a-4i are schematic diagrams of generation of a sample head smear image provided by an embodiment of the present application.
Figure 4B:
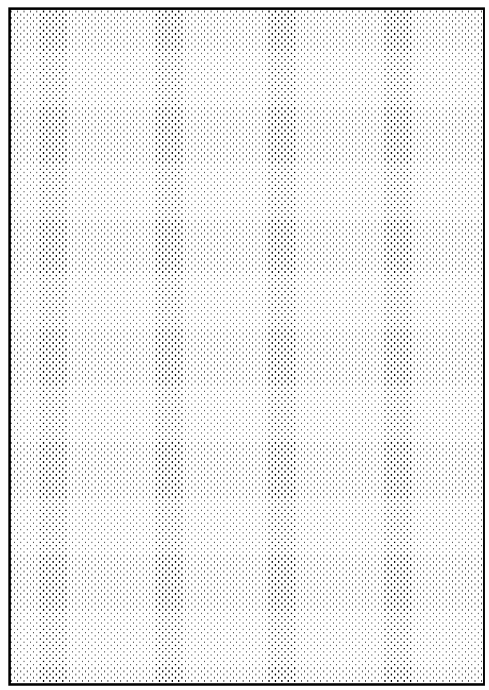
Figure 4C:
Figure 4D:

Illustratively, FIGS. 4a-4d are schematic diagrams of generation of a sample head smear image provided by an embodiment of the present application. Referring to FIGS. 4a-4d, after acquiring a sample portrait image as shown in FIG. 4a, the apparatus for training the image processing model can first take a portrait area in the sample portrait image as a to-be-smeared area, and then smear the to-be-smeared area in the sample portrait image with a pixel value of a background area in the sample portrait image to generate a first image as shown in FIG. 4b. Subsequently, the apparatus for training the image processing model performs hair segmentation on the sample portrait image to generate a second image which characterizes a hair area of the portrait located above the preset boundary in the sample portrait image as shown in FIG. 4c. Thereafter, the apparatus for training the image processing model smears a hair area corresponding to the second image in the sample portrait image with the first image to obtain the sample head smear image corresponding to the sample portrait image as shown in FIG. 4d.

S202: training the image processing model with the sample data set to generate a trained image processing model.

Figure 5:
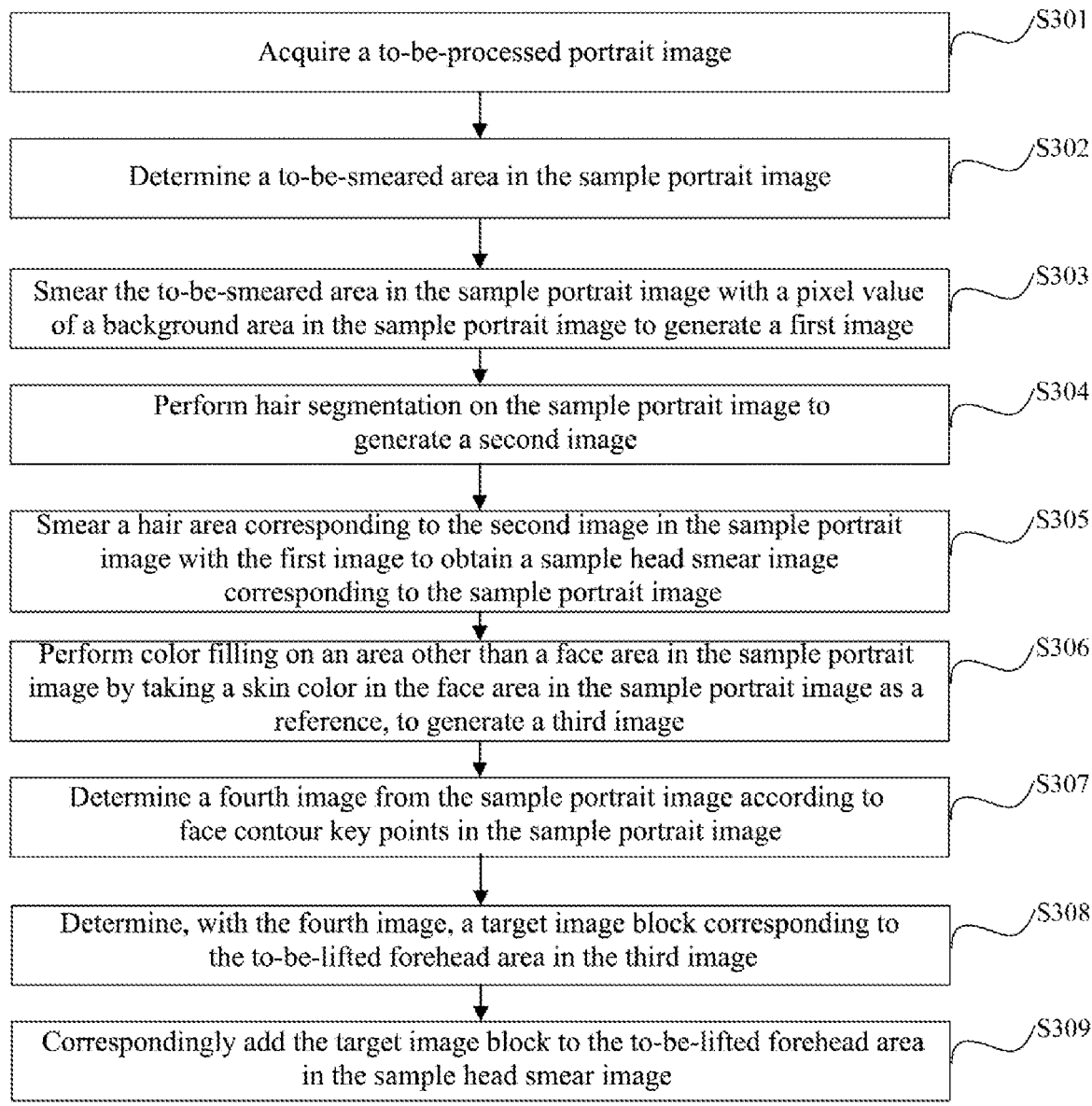
FIG. 5 is a schematic flowchart of a method for generating a sample data set provided by an embodiment of the present disclosure.

On the basis of the above embodiments, how to generate the sample head smear image corresponding to the sample portrait image will be described in detail below. Referring to FIG. 5, FIG. 5 is a schematic flowchart of a method for generating a sample data set provided by an embodiment of the present disclosure. In the embodiment, the process of how the apparatus for training the image processing model generates the sample head smear image is described in detail, where the method for generating the sample data set includes the following.

S301: acquiring the sample portrait image.

S302: determining a to-be-smeared area in the sample portrait image.

In some embodiments, the to-be-smeared area may include a portrait area above a preset boundary in the sample portrait.

It should be noted that, in addition to the portrait area above the preset boundary in the sample portrait, the to-be-smeared area may also include a portrait area below the preset boundary in the sample portrait, or may not include a portrait area below the preset boundary in the sample portrait, which is not limited in the embodiments of the present application.

Illustratively, if the sample portrait image contains a hair area, a face area, an ear area and a shoulder-neck area, the terminal device can take the hair area, the face area, the ear area and the shoulder-neck area together as the to-be-smeared area.

Illustratively, if the sample portrait image contains a hair area, part of a face area and an ear area, the terminal device can take the hair area, the part of the face area and the ear area together as the to-be-smeared area.

S303: smearing the to-be-smeared area in the sample portrait image with a pixel value of a background area in the sample portrait image to generate a first image.

In the embodiment, there is no limitation on how to acquire the pixel value of the background area in the sample portrait image. In some embodiments, the apparatus for training the image processing model can extract the pixel value of the background area in the sample portrait image by using a basic algorithm of down-sampling and up-sampling.

In the basic algorithm of down-sampling and up-sampling, the pixel value of the background area in the sample portrait image can be extracted by scaling the background area.

S304: performing hair segmentation on the sample portrait image to generate a second image, where the second image is used to characterize a hair area of the portrait located above the preset boundary in the sample portrait image.

Figure 4E:

It should be understood that due to the existence of the preset boundary, not all the divided hair area need to be smeared. Therefore, in the process of generating the second image, the apparatus for training the image processing model can first perform hair segmentation on the sample portrait image to acquire an initial hair area image in the sample portrait image as shown in FIG. 4e, and then correct the initial hair area image in the sample portrait image according to face key points in the sample portrait image and the preset boundary of the portrait in the sample portrait image to obtain the second image as shown in FIG. 4c.

Specifically, the apparatus for training the image processing model can first determine a face contour through face key points, then use the face contour to correct the contour of the initial hair area, and finally remove a hair part in the initial hair area below the preset boundary that does not need to be smeared based on the preset boundary of the portrait, thus generating the second image as shown in FIG. 4c.

In an embodiment, if the preset boundary is located below an ear of the portrait, the apparatus for training the image processing model also needs to perform ear segmentation on the sample portrait image to determine an ear area image in the sample portrait image, and remove the ear area from the hair area. Thereafter, the face contour is determined based on the face key points, and the contour of the initial hair area is corrected by the face contour. Finally, the hair part below the preset boundary in the initial hair area that does not need to be smeared are removed based on the preset boundary of the portrait, thereby generating the second image.

In an embodiment, after generating the second image, the apparatus for training the image processing model can also perform gradation processing on hairs located in the preset area in the second image, so that the hairs located in the preset area gradually change in color from bottom to top to a background color of the sample portrait image. The preset area is adjacent to the preset boundary and located above the preset boundary. In the embodiment, there is no limitation on how to perform gradation processing, and for example, Gaussian blur processing can be adopted.

It should be understood that the preset area is adjacent to the preset boundary and located above the preset boundary. In the embodiment, there is no limitation on a size of the preset area, which can be preset by a user or determined according to a size of the to-be-processed portrait image.

Figure 4F:

Illustratively, if the preset boundary includes a shoulder-neck boundary, correspondingly, on the basis of the second image as shown in FIG. 4c, Gaussian blur processing can be performed on hairs in the preset area above the shoulder-neck boundary (the shadow area in FIG. 4f) as shown in FIG. 4f, so that color of hairs of the shoulder-neck part gradually changes, from bottom to top, to the background color after smearing.

S305: smearing a hair area corresponding to the second image in the sample portrait image with the first image to obtain a sample head smear image corresponding to the sample portrait image.

Illustratively, after generating the second image on which gradation processing has been performed, the apparatus for training the image processing model can first determine the hair area corresponding to the second image in the sample portrait image, and then smear the hair area corresponding to the second image with the background color in the first image to obtain the sample head smear image corresponding to the sample portrait image as shown in FIG. 4d.

In an embodiment, the method for generating the sample data set in FIG. 5, after step S305, may further include: S306-S309.

S306: performing color filling on an area other than a face area in the sample portrait image by taking a skin color in the face area in the sample portrait image as a reference, to generate a third image.

Figure 4G:

In the embodiment, the apparatus for training the image processing model can extract the skin color from the face area in the sample portrait image by way of up-sampling and down-sampling, and then use the skin color to perform color filling on the area other than the face area in the sample portrait image to generate the third image shown in FIG. 4g.

S307: determining a fourth image from the sample portrait image according to face contour key points in the sample portrait image, where the fourth image is used to characterize a to-be-lifted forehead area in the sample portrait image.

Figure 4H:
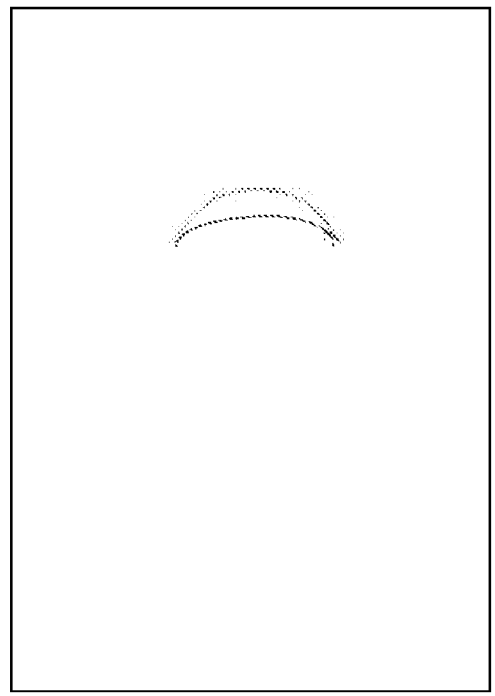

In some embodiments, the apparatus for training the image processing model can first lift the forehead key points among the face contour key points according to a preset distance value, and then circle the to-be-lifted forehead area in the sample portrait image according to lines 16onnecting the lifted forehead key points to obtain the fourth image as shown in FIG. 4h.

In other embodiments, the forehead area circled in the sample portrait image according to lines connecting the lifted forehead key points can be used as the initial forehead area, and subsequently, the second image can be used to obtain an intersection with the initial forehead area to correct the initial area. Finally, the intersection area between the second image and the initial forehead area can be used as the fourth image characterizing the to-be-lifted forehead area in the sample portrait image.

It should be noted that there is no limitation on the preset distance value in the embodiment, the preset distance value can be preset by the user, or can be automatically adjusted according to a size of the portrait image and/or a distance between the forehead of the portrait and the top edge of the portrait image.

S308: determining, with the fourth image, a target image block corresponding to the to-be-lifted forehead area in the third image.

In the embodiment, the apparatus for training the image processing model can first determine a position of the to-be-lifted forehead area by using the fourth image, and subsequently extract a block of the to-be-lifted forehead area from the third image as the target image block.

S309: correspondingly adding the target image block to the to-be-lifted forehead area in the sample head smear image.

Figure 4I:
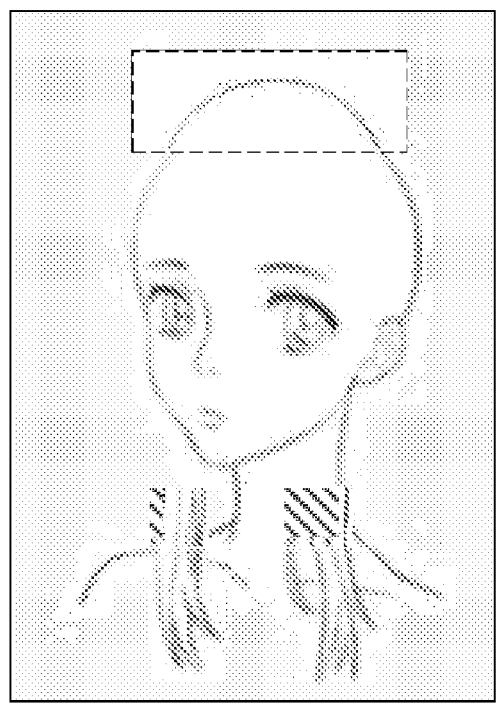

In the embodiment, after extracting the target image block, the apparatus for training the image processing model uses the fourth image to determine, in the sample head smear image, an area where the to-be-lifted forehead is located, and adds the target image block to the area where the to-be-lifted forehead is located, thus forming the sample head smear image with the lifted forehead area as shown in FIG. 4i.

In the present application, by lifting the forehead area, the sample head smear image can be better attached when being subsequently rendered with the head effect material, thus avoiding the problem of fracture or unnatural connection between the forehead and the head effect material.

Figure 6:
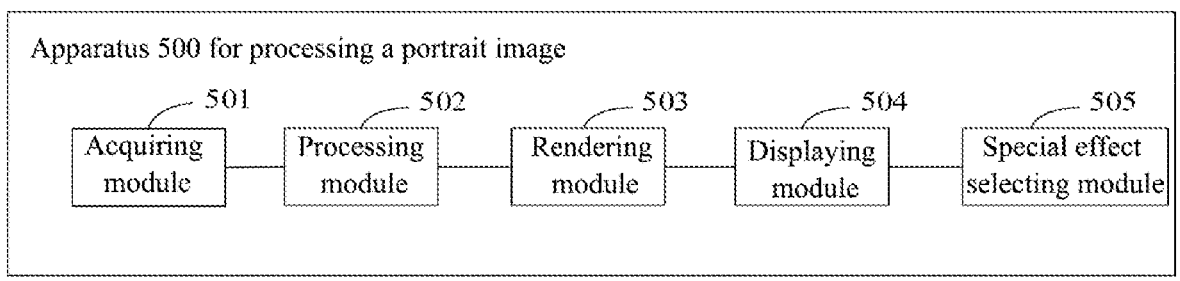
FIG. 6 is a structural block diagram of an apparatus for processing a portrait image provided by an embodiment of the present disclosure.

Corresponding to the method for processing the portrait image in the above embodiments, FIG. 6 is a structural block diagram of an apparatus for processing a portrait image provided by an embodiment of the present disclosure. For convenience of explanation, only parts related to the embodiments of the present disclosure are shown. Referring to FIG. 6, the apparatus 500 for processing the portrait image includes: an acquiring module 501, a processing module 502, a rendering module 503, a displaying module 504 and an effect selecting module 505.

The acquiring module 501 is configured to acquire a to-be-processed portrait image.

The processing module 502 is configured to: input the to-be-processed portrait image into an image processing model, and acquire a head smear image output by the image processing model, where the image processing model is configured to smear a hair area of a portrait located above a preset boundary in the portrait image, and the image processing model is generated by training a sample data set of a sample portrait image and a sample head smear image corresponding to the sample portrait image.

The rendering module 503 is configured to render the head smear image with a head effect material to obtain a portrait image added with an effect.

The displaying module 504 is configured to display the portrait image added with the effect.

In an embodiment of the present disclosure, if the portrait in the to-be-processed portrait image has hairs long enough to stretch below the preset boundary, the image processing model is configured to smear a hair area located above the preset boundary and outside a preset area with a background color of the portrait image, and perform gradation smear processing on hairs located in the preset area in such a manner that the hairs located in the preset area gradually change in color from bottom to top to a background color of the portrait image.

The preset area is adjacent to the preset boundary and located above the preset boundary.

In an embodiment of the present disclosure, the preset boundary includes a shoulder-neck boundary.

In an embodiment of the present disclosure, the image processing model is further configured to perform forehead lifting processing on the portrait of which a hair area is smeared.

In an embodiment of the present disclosure, the apparatus 500 for processing the portrait image further includes:
- an effect selecting module 505, configured to receive an effect selecting instruction from a user; determine, according to the effect selecting instruction, the head effect material selected by the user.

In an embodiment of the present disclosure, the to-be-processed portrait image is a frame of image in a captured video.

In an embodiment of the present disclosure, the head effect material includes multiple head effect elements; the rendering module 503 is specifically configured to render the head smear image with a target head effect element, where the target head effect element is one of the multiple head effect elements.

In an embodiment of the present disclosure, the target head effect element is a head effect element selected from the multiple head effect elements based on a collected effect switching instruction of a user; or, the target head effect element is a head effect element selected from the multiple head effect elements based on a preset effect switching period.

The apparatus 500 for processing a portrait image provided in the embodiment can be used to implement the technical solutions of the above method embodiments, and the implementation principle and technical effect thereof are similar, which will not be repeated here in the embodiment.

Figure 7:
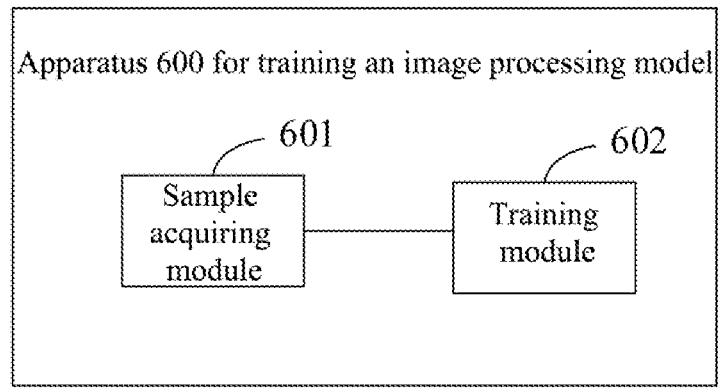
FIG. 7 is a structural block diagram of an apparatus for training an image processing model provided by an embodiment of the present disclosure.

Corresponding to the method for training an image processing model in the above embodiments, FIG. 7 is a structural block diagram of a training apparatus of an image processing model provided by an embodiment of the present disclosure. For convenience of explanation, only parts related to the embodiments of the present disclosure are shown. Referring to FIG. 7, the apparatus for training an image processing model 600 includes: a sample acquiring module 601, and a training module 602.

The sample acquiring module 601 is configured to acquire a sample data set, where the sample data set includes a sample portrait image and a sample head smear image corresponding to the sample portrait image, where the sample head smear image is generated by smearing a hair area of a portrait located above a preset boundary in the sample portrait image.

The training module 602 is configured to train the image processing model with the sample data set to generate a trained image processing model.

In an embodiment of the present disclosure, the sample acquiring module 601 is specifically configured to: acquire the sample portrait image; determine a to-be-smeared area in the sample portrait image, where the to-be-smeared area includes a portrait area located above the preset boundary; smear the to-be-smeared area in the sample portrait image with a pixel value of a background area in the sample portrait image to generate a first image; perform hair segmentation on the sample portrait image to generate a second image, where the second image is used to characterize a hair area of the portrait located above the preset boundary in the sample portrait image; and smear a hair area corresponding to the second image in the sample portrait image with the first image to obtain a sample head smear image corresponding to the sample portrait image.

In an embodiment of the present disclosure, the sample acquiring module 601 is specifically configured to perform hair segmentation on the sample portrait image to acquire an initial hair area image in the sample portrait image; correct the initial hair area image in the sample portrait image according to face key points in the sample portrait image and the preset boundary of the portrait in the sample portrait image to obtain the second image.

In an embodiment of the present disclosure, if the preset boundary is located below an ear of the portrait, the sample acquiring module 601 is specifically configured to: perform ear segmentation on the sample portrait image to determine an ear area image in the sample portrait image; correct the initial hair area image in the sample portrait image according to the ear area image in the sample portrait image, the face key points in the sample portrait image and the preset boundary of the portrait in the sample portrait image to obtain the second image.

In an embodiment of the present disclosure, the sample acquiring module 601 is further configured to perform gradation processing on hairs located in the preset area in the second image in such a manner that the hairs located in the preset area gradually change in color from bottom to top to a background color of the sample portrait image;
where the preset area is adjacent to the preset boundary and located above the preset boundary.

In an embodiment of the present disclosure, the preset boundary includes a shoulder-neck boundary.

In an embodiment of the present disclosure, the sample acquiring module 601 is further configured to: perform color filling on an area other than a face area in the sample portrait image by taking a skin color in the face area in the sample portrait image as a reference, to generate a third image; determine a fourth image from the sample portrait image according to face contour key points in the sample portrait image, where the fourth image is used to characterize a to-be-lifted forehead area in the sample portrait image; determine, with the fourth image, a target image block corresponding to the to-be-lifted forehead area in the third image; add the target image block to the to-be-lifted forehead area in the sample head smear image.

In an embodiment of the present disclosure, the sample acquiring module 601 is specifically configured to lift a forehead key point among the face contour key points according to a preset distance value; determine the fourth image from the sample portrait image according to the lifted forehead key point and the second image.

The apparatus for training an image processing model 600 provided in the embodiment can be used to implement the technical solutions of the above method embodiments, and the implementation principle and technical effect thereof are similar, which will not be repeated here in the embodiment.

Figure 8:
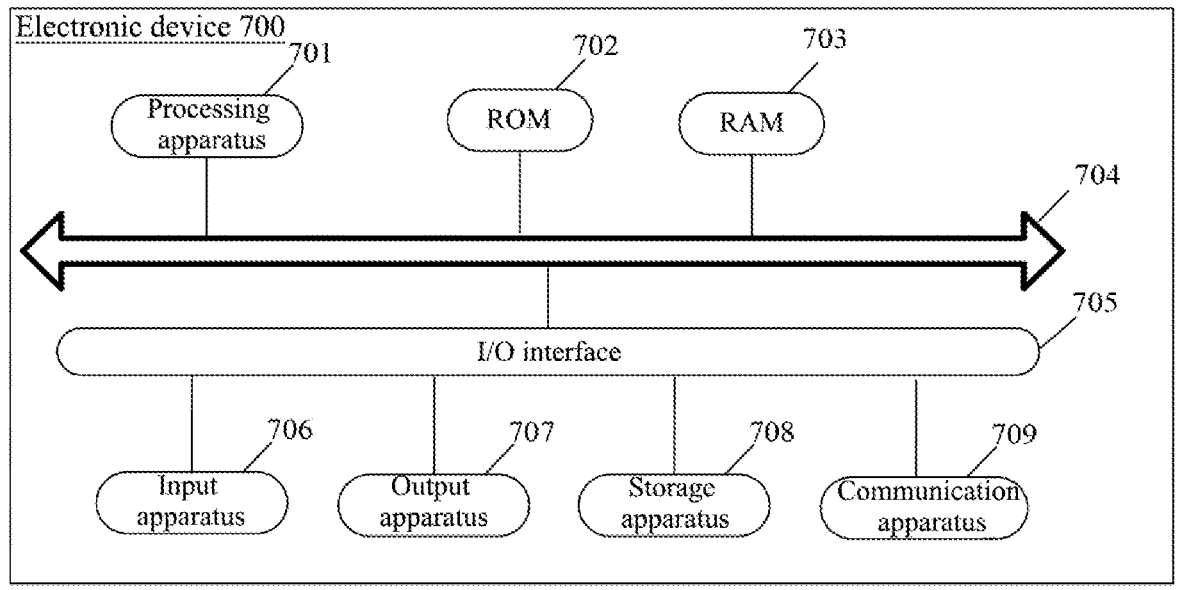
FIG. 8 is a schematic structural diagram of hardware of an electronic device provided by an embodiment of the present disclosure.

Referring to FIG. 8, FIG. 8 shows a schematic structural diagram of an electronic device 700 suitable for implementing an embodiment of the present disclosure, and the electronic device 700 may be a terminal device or a server. The terminal device may include, but is not limited to: a mobile terminal such as a mobile phone, a notebook computer, a digital broadcast receiver, a personal digital assistant (PDA), a portable android device (PAD), a portable media player (PMP), a vehicle-mounted terminal (e.g., a vehicle-mounted navigation terminal), and a wearable electronic device, and a stationary terminal such as a digital TV (Television), a desktop computer, a smart home device, etc. The electronic device shown in FIG. 8 is only an example, which should not bring any limitation to the function and the use range of the embodiments of the present disclosure.

As shown in FIG. 8, the electronic device 700 may include a processing apparatus (such as a central processor, a graphics processor or the like) 701, which may execute various appropriate actions and processes according to programs stored in a read only memory (ROM) 702 or programs loaded into a random access memory (RAM) 703 from a storage apparatus 708, so as to realize the above-mentioned method for processing an image and/or method for training an image processing model defined in the methods of the embodiments of the present disclosure. In the RAM 703, various programs and data necessary for the operation of the electronic device 700 are also stored. The processing apparatus 701, the ROM 702, and the RAM 703 are connected to each other through a bus 704. An input/output (I/O) interface 705 is also connected to the bus 704.

Generally, the following devices can be connected to the I/O interface 705: an input apparatus 706 including, for example, a touch screen, a touch pad, a keyboard, a mouse, a camera, a microphone, an accelerometer, a gyroscope and the like; an output apparatus 707 including, for example, a liquid crystal display (LCD), a speaker, a vibrator and the like; a storage device 708 including, for example, a magnetic tape, a hard disk and the like, a communication apparatus 709. The communication apparatus 709 may allow the electronic device 700 to communicate in a wireless manner or a wired manner with other devices to exchange data. Although FIG. 8 shows an electronic device 700 having various apparatuses, it should be understood that it is not required to implement or have all of the apparatuses illustrated. More or fewer apparatuses may alternatively be implemented or provided.

In particular, according to the embodiments of the present disclosure, the process described above with reference to the flow chart can be implemented as a computer software program. For example, an embodiment of the present disclosure includes a computer program product, the computer program product includes a computer program carried on a computer readable medium, where the computer program contains program codes for executing the method shown in the flow charts. In such embodiment, the computer program can be downloaded and installed from a network through the communication apparatus 709, or installed from the storage apparatus 708 or installed from the ROM 702. When the computer program is executed by the processing apparatus 701, the method for processing the portrait image defined in the method of the embodiments of the present disclosure is executed, or the method for training an image processing model defined in the method of the embodiments of the present disclosure is executed.

Embodiments of the present disclosure also provide a computer program which is stored in a readable storage medium, where one or more processors of an electronic device can read the computer program from the readable storage medium, and the one or more processors execute the computer program, causing the electronic device to execute the solution provided in any one of the above embodiments.

It should be noted that the above computer readable medium in the present disclosure can be a computer readable signal medium or a computer readable storage medium or any combination of the two. The computer readable storage medium can be, for example, but not limited to, an electrical, magnetic, optical, electromagnetic, infrared, or semiconductor system, apparatus, or device, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory for short), an optical fiber, a compact disk read-only memory (CD-ROM), an optical storage device, and a magnetic storage device. In the present disclosure, the computer readable storage medium can be any tangible medium containing or storing a program, where the program can be used by or in connection with an instruction execution system, apparatus or device. Rather, in the present disclosure, the computer readable signal medium may include a data signal propagated in baseband or as a part of a carrier wave in which computer readable program codes are carried. This propagated data signal can adopt various manners, including but not limited to an electromagnetic signal, an optical signal or any suitable combination of the above. The computer readable signal medium can also be any computer readable medium other than a computer readable storage medium, and the computer readable signal medium can send, propagate or transmit a program for use by or in connection with an instruction execution system, apparatus or device. The program codes contained on the computer readable medium can be transmitted by any suitable medium including but not limited to: an electric wire, an optical cable, radio frequency (RF), etc., or any suitable combination of the above.

The above computer readable medium may be contained in the above electronic device; or may exist separately instead of being assembled into the electronic device.

The above computer readable medium carries one or more programs, and the one or more programs, when executed by the electronic device, cause the electronic device to execute the methods shown in the above embodiments, for example, the above-mentioned method for processing an image and/or method for training an image processing model defined in the methods of the embodiments of the present disclosure is executed.

The computer program codes for executing the operations of the present disclosure can be written in one or more programming languages or a combination thereof, where the above programming languages include object-oriented programming languages such as Java, Smalltalk, C++, and also conventional procedural programming languages such as "C" language or similar programming languages. The program codes can be completely executed on a user computer, partially executed on the user computer, executed as an independent software package, partially executed on the user computer and partially executed on a remote computer, or completely executed on a remote computer or a server. In case of involving a remote computer, the remote computer can be connected to the user computer through any kind of networks, including a local area network (LAN) or a wide area network (WAN), or can be connected to an external computer (for example, to be connected through the Internet by virtue of an Internet service provider).

The flow charts and block diagrams in the drawings illustrate the architecture, functions and operations of possible implementations of systems, methods and computer program products according to various embodiments of the present disclosure. In this regard, each block in the flow charts or block diagrams may represent a module, a program segment, or a part of codes, where the module, the program segment, or the part of codes contains one or more executable instructions for implementing specified logical functions. It should also be noted that in some alternative implementations, the functions indicated in the blocks may also occur in a different order than those indicated in the drawings. For example, two blocks shown one after the other can actually be executed in parallel substantially, or they may sometimes be executed in an opposite order, depending on functions involved. It should also be noted that each block in the block diagrams and/or flow charts, and combinations of blocks in the block diagrams and/or flow charts, can be implemented with a dedicated hardware-based system that performs specified functions or operations, or can be implemented with combinations of dedicated hardware and computer instructions.

An involved unit described in the embodiments of the present disclosure can be implemented by software or hardware. A name of the unit does not constitute a limitation on the unit itself in some cases. For example, an acquiring module can also be described as "a unit for acquiring a to-be-processed portrait image".

The above functions described herein may be performed, at least in part, by one or more hardware logic components. For example, without limitation, exemplary types of hardware logic components that can be used include a field-programmable gate array (FPGA), an application specific integrated circuit (ASIC), an application specific standard product (ASSP), a system-on-a-chip (SOC), a complex programmable logic device (CPLD), etc.

In the context of the present disclosure, the machine readable medium may be a tangible medium that may contain or store a program for use by or in connection with an instruction execution system, apparatus or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the above contents. More specific examples of machine-readable storage medium might include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

In a first aspect, according to one or more embodiments of the present disclosure, there is provided a method for processing a portrait image, including:
acquiring a to-be-processed portrait image;
inputting the to-be-processed portrait image into an image processing model, and acquiring a head smear image output by the image processing model, where the image processing model is configured to smear a hair area of a portrait located above a preset boundary in the portrait image, and the image processing model is generated by training a sample data set of a sample portrait image and a sample head smear image corresponding to the sample portrait image;
rendering the head smear image with a head effect material to obtain a portrait image added with an effect; and
displaying the portrait image added with the effect.

According to one or more embodiments of the present disclosure, if the portrait in the to-be-processed portrait image has hairs long enough to stretch below the preset boundary, the image processing model is configured to smear a hair area located above the preset boundary and outside a preset area with a background color of the portrait image, and perform gradation smear processing on hairs located in the preset area in such a manner that the hairs located in the preset area gradually change in color from bottom to top to a background color of the portrait image;
where the preset area is adjacent to the preset boundary and located above the preset boundary.

According to one or more embodiments of the present disclosure, the preset boundary includes a shoulder-neck boundary.

According to one or more embodiments of the present disclosure, the image processing model is further configured to perform forehead lifting processing on the portrait of which a hair area is smeared.

According to one or more embodiments of the present disclosure, before the rendering the head smear image with the head effect material to obtain the portrait image added with the effect, the method further includes:
receiving an effect selecting instruction from a user;
determining, according to the effect selecting instruction, the head effect material selected by the user.

According to one or more embodiments of the present disclosure, the to-be-processed portrait image is a frame of image in a captured video.

According to one or more embodiments of the present disclosure, the head effect material includes multiple head effect elements;
where the rendering the head smear image with the head effect material includes:
rendering the head smear image with a target head effect element, where the target head effect element is one of the multiple head effect elements.

According to one or more embodiments of the present disclosure, the target head effect element is a head effect element selected from the multiple head effect elements based on a collected effect switching instruction of a user; or,
the target head effect element is a head effect element selected from the multiple head effect elements based on a preset effect switching period.

In a second aspect, according to one or more embodiments of the present disclosure, there is provided a method for training an image processing model, including:
acquiring a sample data set, where the sample data set includes a sample portrait image and a sample head smear image corresponding to the sample portrait image, where the sample head smear image is generated by smearing a hair area of a portrait located above a preset boundary in the sample portrait image;
training the image processing model with the sample data set to generate a trained image processing model.

According to one or more embodiments of the present disclosure, the acquiring the sample data set of the image processing model includes:
acquiring the sample portrait image;
determining a to-be-smeared area in the sample portrait image, where the to-be-smeared area includes a portrait area located above the preset boundary;

smearing the to-be-smeared area in the sample portrait image with a pixel value of a background area in the sample portrait image to generate a first image;

performing hair segmentation on the sample portrait image to generate a second image, where the second image is used to characterize a hair area of the portrait located above the preset boundary in the sample portrait image;

smearing a hair area corresponding to the second image in the sample portrait image with the first image to obtain a sample head smear image corresponding to the sample portrait image.

According to one or more embodiments of the present disclosure, the performing hair segmentation on the sample portrait image to generate the second image includes:

performing hair segmentation on the sample portrait image to acquire an initial hair area image in the sample portrait image;

correcting the initial hair area image in the sample portrait image according to face key points in the sample portrait image and the preset boundary of the portrait in the sample portrait image to obtain the second image.

According to one or more embodiments of the present disclosure, if the preset boundary is located below an ear of the portrait, before the correcting the initial hair area image in the sample portrait image to obtain the second image, the method further includes:

performing ear segmentation on the sample portrait image to determine an ear area image in the sample portrait image;

the correcting the initial hair area image in the sample portrait image to obtain the second image includes:

correcting the initial hair area image in the sample portrait image according to the ear area image in the sample portrait image, the face key points in the sample portrait image and the preset boundary of the portrait in the sample portrait image to obtain the second image.

According to one or more embodiments of the present disclosure, after the generating the second image, the method further includes:

performing gradation processing on hairs located in the preset area in the second image in such a manner that the hairs located in the preset area gradually change in color from bottom to top to a background color of the sample portrait image;

where the preset area is adjacent to the preset boundary and located above the preset boundary.

According to one or more embodiments of the present disclosure, the preset boundary includes a shoulder-neck boundary.

According to one or more embodiments of the present disclosure, the method further includes:

performing color filling on an area other than a face area in the sample portrait image by taking a skin color in the face area in the sample portrait image as a reference, to generate a third image;

determining a fourth image from the sample portrait image according to face contour key points in the sample portrait image, where the fourth image is used to characterize a to-be-lifted forehead area in the sample portrait image;

determining, with the fourth image, a target image block corresponding to the to-be-lifted forehead area in the third image;

correspondingly adding the target image block to the to-be-lifted forehead area in the sample head smear image.

According to one or more embodiments of the present disclosure, the determining the fourth image from the sample portrait image according to the face contour key points in the sample portrait image includes:

lifting a forehead key point among the face contour key points according to a preset distance value;

determining the fourth image from the sample portrait image according to the lifted forehead key point and the second image.

In a third aspect, according to one or more embodiments of the present disclosure, there is provided an apparatus for processing a portrait image, including: an acquiring module, a processing module, a rendering module and a displaying module;

the acquiring module is configured to acquire a to-be-processed portrait image;

the processing module is configured to input the to-be-processed portrait image into an image processing model, and acquire a head smear image output by the image processing model, where the image processing model is configured to smear a hair area of a portrait located above a preset boundary in the portrait image, and the image processing model is generated by training a sample data set of a sample portrait image and a sample head smear image corresponding to the sample portrait image;

the rendering module is configured to render the head smear image with a head effect material to obtain a portrait image added with an effect;

the displaying module is configured to display the portrait image added with the effect.

According to one or more embodiments of the present disclosure, if the portrait in the to-be-processed portrait image has hairs long enough to stretch below the preset boundary, the image processing model is configured to smear a hair area located above the preset boundary and outside a preset area with a background color of the portrait image, and perform gradation processing on hairs located in the preset area in such a manner that the hairs located in the preset area gradually change in color from bottom to top to a background color of the portrait image;

where the preset area is adjacent to the preset boundary and located above the preset boundary.

According to one or more embodiments of the present disclosure, the preset boundary includes a shoulder-neck boundary.

According to one or more embodiments of the present disclosure, the image processing model is further configured to perform forehead lifting processing on the portrait of which a hair area is smeared.

According to one or more embodiments of the present disclosure, the apparatus for processing the portrait image further includes:

an effect selecting module, configured to receive an effect selecting instruction from a user, and determine, according to the effect selecting instruction, the head effect material selected by the user.

According to one or more embodiments of the present disclosure, the to-be-processed portrait image is a frame of image in a captured video.

According to one or more embodiments of the present disclosure, the head effect material includes multiple head effect elements; the rendering module is specifically configured to render the head smear image with a target head effect element, where the target head effect element is one of the multiple head effect elements.

According to one or more embodiments of the present disclosure, the target head effect element is a head effect element selected from the multiple head effect elements based on a collected effect switching instruction of a user; or, the target head effect element is a head effect element selected from the multiple head effect elements based on a preset effect switching period.

In a fourth aspect, according to one or more embodiments of the present disclosure, there is provided an apparatus for training an image processing model, including: a sample acquiring module, and a training module;

the sample acquiring module is configured to acquire a sample data set, where the sample data set includes a sample portrait image and a sample head smear image corresponding to the sample portrait image, where the sample head smear image is generated by smearing a hair area of a portrait located above a preset boundary in the sample portrait image; and the training module is configured to train the image processing model with the sample data set to generate a trained image processing model.

According to one or more embodiments of the present disclosure, the sample acquiring module is specifically configured to: acquire the sample portrait image; determine a to-be-smeared area in the sample portrait image, where the to-be-smeared area includes a portrait area located above the preset boundary; smear the to-be-smeared area in the sample portrait image with a pixel value of a background area in the sample portrait image to generate a first image; perform hair segmentation on the sample portrait image to generate a second image, where the second image is used to characterize a hair area of the portrait located above the preset boundary in the sample portrait image; and smear a hair area corresponding to the second image in the sample portrait image with the first image to obtain a sample head smear image corresponding to the sample portrait image.

According to one or more embodiments of the present disclosure, the sample acquiring module is specifically configured to perform hair segmentation on the sample portrait image to acquire an initial hair area image in the sample portrait image; correct the initial hair area image in the sample portrait image according to face key points in the sample portrait image and the preset boundary of the portrait in the sample portrait image to obtain the second image.

According to one or more embodiments of the present disclosure, if the preset boundary is located below an ear of the portrait, the sample acquiring module is specifically configured to: perform ear segmentation on the sample portrait image to determine an ear area image in the sample portrait image; correct the initial hair area image in the sample portrait image according to the ear area image in the sample portrait image, the face key points in the sample portrait image and the preset boundary of the portrait in the sample portrait image to obtain the second image.

According to one or more embodiments of the present disclosure, the sample acquiring module is further configured to perform gradation processing on hairs located in the preset area in the second image in such a manner that the hairs located in the preset area gradually change in color from bottom to top to a background color of the sample portrait image;

where the preset area is adjacent to the preset boundary and located above the preset boundary.

According to one or more embodiments of the present disclosure, the preset boundary includes a shoulder-neck boundary.

According to one or more embodiments of the present disclosure, the sample acquiring module is further configured to: perform color filling on an area other than a face area in the sample portrait image by taking a skin color in the face area in the sample portrait image as a reference, to generate a third image; determine a fourth image from the sample portrait image according to face contour key points in the sample portrait image, where the fourth image is used to characterize a to-be-lifted forehead area in the sample portrait image; determine, with the fourth image, a target image block corresponding to the to-be-lifted forehead area in the third image; add the target image block to the corresponding to-be-lifted forehead area in the sample head smear image.

According to one or more embodiments of the present disclosure, the sample acquiring module is specifically configured to: lift a forehead key point among the face contour key points according to a preset distance value; determine the fourth image from the sample portrait image according to the lifted forehead key point and the second image.

In a fifth aspect, according to one or more embodiments of the present disclosure, there is provided an electronic device, including: at least one processor and a memory;

the memory stores computer-executed instructions;

the at least one processor executes the computer-executed instructions stored in the memory, so as to enable the at least one processor to execute the method for processing the portrait image as described above in the first aspect and various possible designs of the first aspect, or execute the method for training the image processing model as described above in the second aspect and various possible designs of the second aspect.

In a sixth aspect, according to one or more embodiments of the present disclosure, there is provided a computer-readable storage medium storing computer-executable instructions, when the computer-executable instructions are executed by a processor, the method for processing the portrait image as described above in the first aspect and various possible designs of the first aspect is implemented, or the method for training the image processing model as described above in the second aspect and various possible designs of the second aspect is implemented.

In a seventh aspect, according to one or more embodiments of the present disclosure, there is provided a computer program product containing computer instructions, when the computer instructions are executed by a processor, the method for processing the portrait image as described above in the first aspect and various possible designs of the first aspect is implemented, or the method for training the image processing model as described above in the second aspect and various possible designs of the second aspect is implemented.

In an eighth aspect, according to one or more embodiments of the present disclosure, there is provided a computer program, when the computer program is executed by a processor, the method for processing the portrait image as described above in the first aspect and various possible designs of the first aspect is implemented, or the method for training the image processing model as described above in the second aspect and various possible designs of the second aspect is implemented. The above description is only a description of preferred embodiments of the present disclosure and applied technical principles. It should be understood by those skilled in the art that the disclosured scope involved in the present disclosure is not limited to the technical solution formed by the specific combination of the above technical features, but also covers other technical solutions formed by any combination of the above technical features or equivalent features thereof without departing from the concept of the above disclosure. For example, the technical solution formed by replacing the above features with technical features with similar functions disclosed in (but not limited to) the present disclosure.

In addition, although the operations are depicted in a particular order, this should not be understood as requiring that the operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of separate embodiments may also be implemented in a single embodiment in combination. On the contrary, various features described in the context of a single embodiment can also be implemented in multiple embodiments individually or in any suitable sub-combination.

Although the subject matter has been described in a language specific to structural features and/or logical acts of methods, it should be understood that the subject matter defined in the appended claims is not necessarily limited to the specific features or acts described above. On the contrary, the specific features and actions described above are merely exemplary forms for implementing the claims.

What is claimed is:

1. A method for processing a portrait image, comprising:
   acquiring a first portrait image;
   inputting the first portrait image into an image processing model, and acquiring a head smear image output by the image processing model, wherein the image processing model is configured to smear a hair area of a portrait located above a preset boundary in the first portrait image, and the image processing model is generated by training a sample data set of a sample portrait image and a sample head smear image corresponding to the sample portrait image;
   rendering the head smear image with a head effect material to obtain a second portrait image, wherein the second portrait image is a first image added with an effect; and
   displaying the second portrait image,
   wherein in response to the portrait in the first portrait image having hairs long enough to stretch below the preset boundary, the image processing model is configured to smear a hair area located above the preset boundary and outside a preset area with a background color of the first portrait image, and perform gradation smear processing on hairs located in the preset area in such a manner that the hairs located in the preset area gradually change in color from bottom to top to the background color of the first portrait image, and
   wherein the preset area is adjacent to the preset boundary and located above the preset boundary.

2. The method according to claim 1, wherein the preset boundary comprises a shoulder-neck boundary.

3. The method according to claim 1, wherein the image processing model is further configured to perform forehead lifting processing on the portrait of which a hair area is smeared.

4. The method according to claim 1, wherein before the rendering the head smear image with the head effect material to obtain the second portrait image, the method further comprises:
   receiving an effect selecting instruction from a user;
   determining, according to the effect selecting instruction, the head effect material selected by the user.

5. The method according to claim 1, wherein the head effect material comprises multiple head effect elements;
   wherein the rendering the head smear image with the head effect material comprises:
   rendering the head smear image with a target head effect element, wherein the target head effect element is one of the multiple head effect elements.

6. The method according to claim 5, wherein the target head effect element is a head effect element selected from the multiple head effect elements based on a collected effect switching instruction of a user; or,
   the target head effect element is a head effect element selected from the multiple head effect elements based on a preset effect switching period.

7. A non-transitory computer readable storage medium storing computer-executed instructions, when the computer-executed instructions are executed by a processor, the method according to claim 1 is implemented.

8. A method for training an image processing model, wherein the method comprises:
   acquiring a sample portrait image;
   determining a to-be-smeared area in the sample portrait image, wherein the to-be-smeared area comprises a portrait area located above a preset boundary in the sample portrait image;
   smearing the to-be-smeared area in the sample portrait image with a pixel value of a background area in the sample portrait image to generate a first image;
   performing hair segmentation on the sample portrait image to generate a second image, wherein the second image is used to characterize a hair area located above the preset boundary;
   smearing a hair area corresponding to the second image in the sample portrait image with the first image to obtain a sample head smear image corresponding to the sample portrait image; and
   training the image processing model with a sample data set to generate a trained image processing model, wherein the sample data set comprises the sample portrait image and the sample head smear image corresponding to the sample portrait image,
   wherein in response to a portrait in the sample portrait image having hairs long enough to stretch below the preset boundary, after the generating the second image, the method further comprises:
   performing gradation processing on hairs located in a preset area in the second image in such a manner that the hairs located in the preset area gradually change in color from bottom to top to a background color of the sample portrait image, and
   wherein the preset area is adjacent to the preset boundary and located above the preset boundary.

9. The method according to claim 8, wherein the performing hair segmentation on the sample portrait image to generate the second image comprises:
   performing hair segmentation on the sample portrait image to acquire an initial hair area image in the sample portrait image;
   correcting the initial hair area image in the sample portrait image according to face key points in the sample portrait image and the preset boundary of the portrait in the sample portrait image to obtain the second image.

10. The method according to claim 8, wherein in response to the preset boundary being located below an ear of the portrait, before the correcting the initial hair area image in the sample portrait image to obtain the second image, the method further comprises:
performing ear segmentation on the sample portrait image to determine an ear area image in the sample portrait image;
wherein the correcting the initial hair area image in the sample portrait image to obtain the second image comprises:
correcting the initial hair area image in the sample portrait image according to the ear area image in the sample portrait image, the face key points in the sample portrait image and the preset boundary of the portrait in the sample portrait image to obtain the second image.

11. The method according to claim 8, wherein the preset boundary comprises a shoulder-neck boundary.

12. The method according to claim 8, wherein the method further comprises:
performing color filling on an area other than a face area in the sample portrait image by taking a skin color in the face area in the sample portrait image as a reference, to generate a third image;
determining a fourth image from the sample portrait image according to face contour key points in the sample portrait image, wherein the fourth image is used to characterize a to-be-lifted forehead area in the sample portrait image;
determining, with the fourth image, a target image block corresponding to the to-be-lifted forehead area in the third image;
correspondingly adding the target image block to the to-be-lifted forehead area in the sample head smear image.

13. The method according to claim 12, wherein the determining the fourth image from the sample portrait image according to the face contour key points in the sample portrait image comprises:
lifting a forehead key point among the face contour key points according to a preset distance value;
determining the fourth image from the sample portrait image according to the lifted forehead key point and the second image.

14. An electronic device, comprising: at least one processor and a memory;
wherein the memory is stored with computer-executable instructions;
the at least one processor executes the computer-executable instructions stored in the memory to enable the at least one processor to perform the method according to claim 8.

15. An electronic device, comprising: at least one processor and a memory;
wherein the memory is stored with computer-executable instructions;
the at least one processor executes the computer-executable instructions stored in the memory to enable the at least one processor to:
acquire a first portrait image;
input the first portrait image into an image processing model, and acquire a head smear image output by the image processing model, wherein the image processing model is configured to smear a hair area of a portrait located above a preset boundary in the first portrait image, and the image processing model is generated by training a sample data set of a sample portrait image and a sample head smear image corresponding to the sample portrait image;
render the head smear image with a head effect material to obtain a second portrait image, wherein the second portrait image is a first image added with an effect; and
display the second portrait image,
wherein in response to the portrait in the first portrait image having hairs long enough to stretch below the preset boundary, the image processing model is configured to smear a hair area located above the preset boundary and outside a preset area with a background color of the first portrait image, and perform gradation smear processing on hairs located in the preset area in such a manner that the hairs located in the preset area gradually change in color from bottom to top to the background color of the first portrait image, and
wherein the preset area is adjacent to the preset boundary and located above the preset boundary.

16. The electronic device according to claim 15, wherein the preset boundary comprises a shoulder-neck boundary.

* * * * *